(12) United States Patent
Ostruszka et al.

(10) Patent No.: US 11,357,221 B2
(45) Date of Patent: Jun. 14, 2022

(54) OSCILLATING FISHING LURE

(71) Applicant: FIDDLER DESIGN, INC., Orland Park, IL (US)

(72) Inventors: Sean P. Ostruszka, Orland Park, IL (US); John V. Zambrzycki, Orland Park, IL (US)

(73) Assignee: Fiddler Design, Inc., Orland Park, IL (US)

(*) Notice: Subject to any disclaimer, the term of this patent is extended or adjusted under 35 U.S.C. 154(b) by 0 days.

(21) Appl. No.: 15/803,731

(22) Filed: Nov. 3, 2017

(65) Prior Publication Data
US 2019/0133099 A1   May 9, 2019

(51) Int. Cl.
*A01K 85/14*   (2006.01)
*A01K 85/18*   (2006.01)

(52) U.S. Cl.
CPC .............. *A01K 85/14* (2013.01); *A01K 85/18* (2013.01)

(58) Field of Classification Search
CPC ......... A01K 85/14; A01K 85/00; A01K 85/18
USPC ........................................................ 43/42.47
See application file for complete search history.

(56) References Cited

U.S. PATENT DOCUMENTS

| | | | |
|---|---|---|---|
| 1,806,088 A * | 5/1931 | Schnell | A01K 85/14 43/42.43 |
| 1,910,742 A | 5/1933 | Binns | |
| 2,051,978 A | 8/1936 | Accetta | |
| 2,203,473 A * | 6/1940 | Shannon | A01K 85/14 43/42.06 |
| 2,463,889 A | 3/1949 | Lundemo | |
| 2,509,179 A * | 5/1950 | Warnock | A01K 85/14 43/42.3 |
| 2,645,875 A * | 7/1953 | Chase | A01K 85/14 43/42.18 |
| 2,651,876 A * | 9/1953 | Kohler | A01K 85/16 43/42.22 |
| 2,756,533 A * | 7/1956 | Keith | A01K 85/14 43/42.5 |
| 2,822,637 A * | 2/1958 | Keith | A01K 85/14 43/42.5 |
| 2,834,141 A * | 5/1958 | Quyle | A01K 85/14 43/42.06 |
| 2,948,984 A | 8/1960 | Crawford | |
| 5,113,615 A | 5/1992 | Drachkovitch | |
| 5,226,268 A * | 7/1993 | Sisson, Jr. | A01K 85/00 43/42.11 |
| 5,857,283 A | 1/1999 | Perrick | |

(Continued)

*Primary Examiner* — Christopher R Harmon
(74) *Attorney, Agent, or Firm* — K&L Gates LLP

(57) ABSTRACT

The oscillating fishing lure is a fishing lure comprising a jig having a body with a longitudinal axis, an uppermost surface, a rearward surface, at least one hook, said first hook including a shank and a hook end, said shank being surrounded by and protruding rearwardly from said body, and said hook end being spaced rearwardly behind said rearward surface of said body along said longitudinal axis of said body; a blade having an edge proximal said jig body; and a joining mechanism placed between said body and said blade, wherein at least a first portion of the joining mechanism is mechanically affixed to said body and at least one other portion is mechanically coupled to said blade, whereby retrieval of the lure causes the blade to oscillate. The oscillating-blade action imparts a natural swimming motion to the lure, emulating prey species movements.

26 Claims, 12 Drawing Sheets

(56) References Cited

U.S. PATENT DOCUMENTS

| | | | |
|---|---|---|---|
| 6,578,313 B1* | 6/2003 | Knol | ............ A01K 85/16 |
| | | | 43/42 |
| 7,627,978 B2 | 12/2009 | Davis | |
| 7,726,062 B2 | 6/2010 | Davis | |
| 8,938,907 B2* | 1/2015 | Meade | ............ A01K 85/08 |
| | | | 43/42.1 |
| 9,253,967 B2 | 2/2016 | Davis | |
| 2005/0210731 A1* | 9/2005 | Davis | ............ A01K 85/02 |
| | | | 43/42 |
| 2008/0172924 A1* | 7/2008 | Thorne | ............ A01K 85/00 |
| | | | 43/42.47 |
| 2012/0023805 A1* | 2/2012 | Thorne | ............ A01K 85/00 |
| | | | 43/42.53 |

\* cited by examiner

Fig. 8A
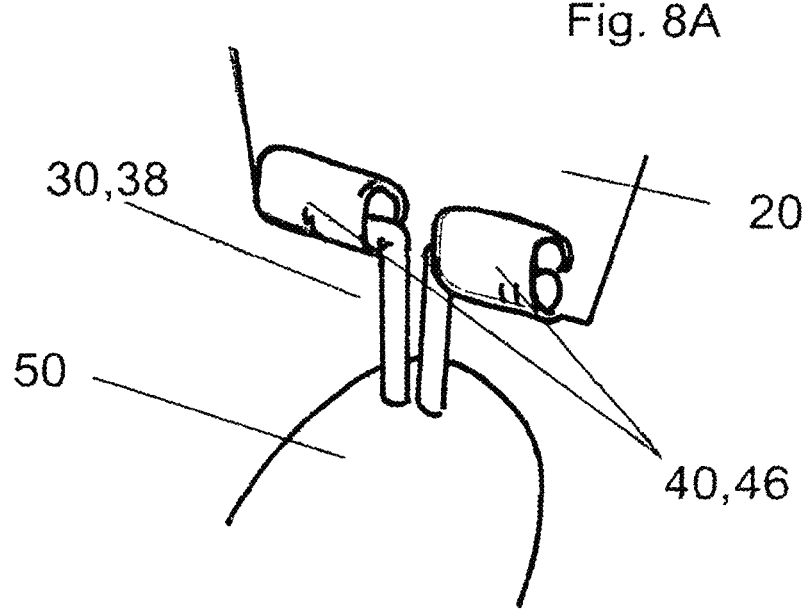
Fig. 8B
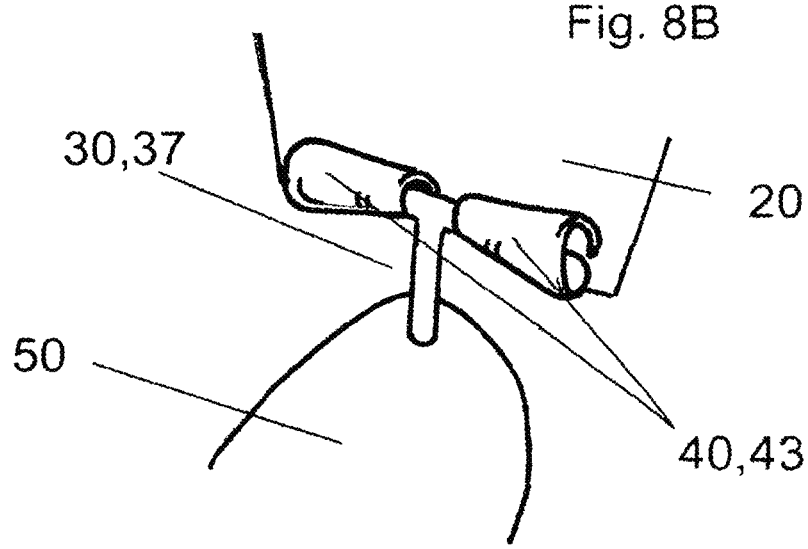
Figure 8

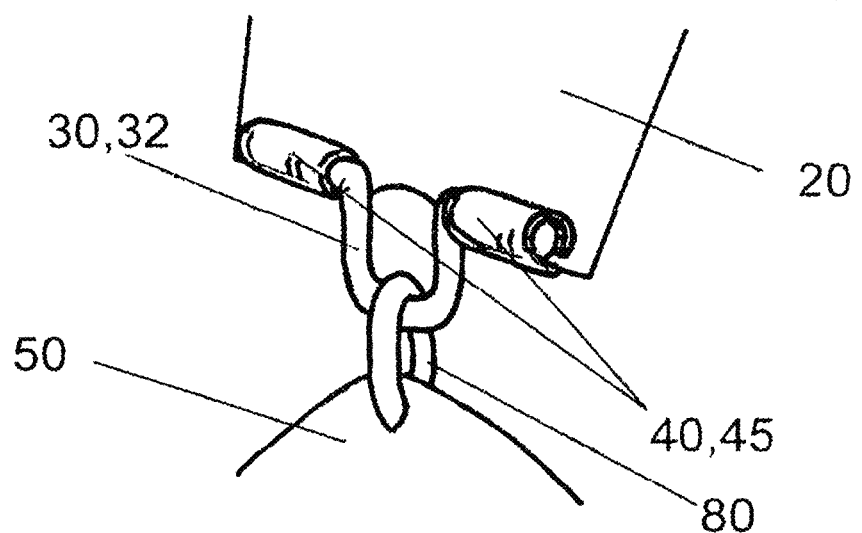
Fig. 9A
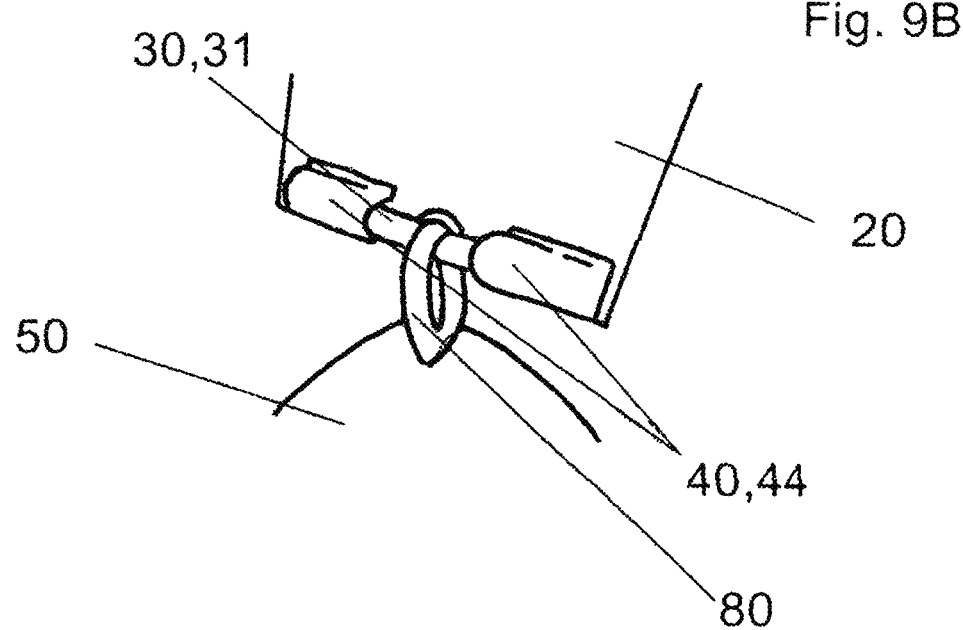
Fig. 9B
Figure 9

OSCILLATING FISHING LURE

TECHNICAL FIELD

The present invention relates to fishing lures; in particular, lures that incorporate an oscillating motion. Specifically, the invention is a fishing lure having a blade member uniquely attached to a weighted jig body to provide an intense vibrating action as movement through water displaces the blade from side to side. The present fishing lure may be configured to dive or to run toward the water surface on retrieval by varying the position on the blade member where the fishing line is attached.

BACKGROUND OF THE INVENTION

It is desirable for a fishing jig to include a blade or other feature to create motion, and to reflect light in order to give the jig a simulated natural swimming motion resembling a minnow or other food source for the sport fish being sought. While many jigs are designed to attract fish in novel ways, none achieve a controlled or controllable oscillating action which can be altered by the user to change the motion of the lure. Thus, there is a need for a lure which produces an underwater movement that is attractive to fish.

U.S. Pat. No. 9,253,967, issued Feb. 9, 2016, U.S. Pat. No. 7,627,978, issued Dec. 8, 2009, and U.S. Pat. No. 7,726,062, issued Jun. 1, 2010, all to J. R. Davis describes a fish lure having a jig and a blade attached in a configuration which limits the side-to-side movement of the blade. The blade is limited in its side-to-side motion by contact between the blade edge and either the jig body or the eyelet, of which the blade must pass through via a hole in the blade. The limited side-to-side movement of the blade creates a quick, oscillating blade action that imparts a natural swimming motion to the lure, emulating prey species movements.

U.S. Pat. No. 5,857,283, issued Apr. 7, 1997 to J. D. Perrick, discloses a fishing lure including a blade having edges that, beginning at the rear edge and going toward the front edge, first converge then diverge towards a blunt, rounded front point, with a hook dressed with feathers, winding thread or the like attached to a rounded rear edge of the blade. The blade includes a slight bend at the rear edge and a slight bend at the front edge, both bends contributing to causing a more life-like motion in the movements of the lure as it is retrieved.

U.S. Pat. No. 2,463,889, issued Mar. 8, 1949 to A. C. Lundemo, describes a fishing lure including an elongated spoon having a flat portion, an intermediate portion and a concave portion. A hook is attached to the concave portion and a staple passes through the intermediate portion for the purpose of connecting to a line. The shape of the elongated spoon causes the lure to move in a sporadic and random fashion, as opposed to a rhythmic pattern.

U.S. Pat. No. 2,948,984, issued Aug. 16, 1960 to W. Crawford, discloses a fishing lure including a concave spoon having a weighted plug attached to one end and a hook attached to the other end. The spoon also has two holes centrally and longitudinally aligned for the purpose of attaching the lure to a line. The shape of the spoon causes the lure to vibrate depending on the speed of retrieval, thereby attracting fish.

Other related patents pertaining to fishing lures include U.S. Pat. No. 1,910,742, issued May 23, 1933 to E. H. Binns (fishing lure including concave spoon and dressed hook attached); U.S. Pat. No. 2,051,978, issued Aug. 25, 1936 to A. C. Accetta (fishing lure including a concave spoon, hook, and fins); and U.S. Pat. No. 5,113,615, issued May 19, 1992 to A. Drachkovitch (spinning spoon fishing lure, including a blade mounted on a swivel and a flexible shaft having hooks attached).

None of the above inventions and patents, taken either singly or in combination, is seen to describe the instant invention as claimed.

SUMMARY OF THE INVENTION

The invention comprises several general aspects. Each of those can, if desired, be combined with additional features, including features disclosed and/or not disclosed herein, the resultant combinations representing more detailed optional embodiments of these aspects.

The following discussion of advantages is not intended to limit the scope of the invention, nor to suggest that every form of the invention will have all of the following advantages. As will be seen from the remainder of this disclosure, the present invention provides a variety of features. These can be used in different combinations. The different combinations are referred to as embodiments. Most embodiments will not include all of the disclosed features. Some simple embodiments can include a very limited selection of these features. Those embodiments may have only one or a few of the advantages described below. Other preferred embodiments will combine more of these features and will reflect more of the following advantages. Particularly preferred embodiments, which incorporate many of these features, will have most if not all of these advantages. Moreover, additional advantages, not disclosed herein, that are inherent in certain embodiments of the invention will become apparent to those who practice or carefully consider the invention.

This invention overcomes problems inherent in fishing lures, in particular, in fishing lures that oscillate in an attempt to mimic the natural swimming motion of prey fish. Previous attempts have significant deficiencies in both manufacturability and operation, which the present invention overcomes.

In a first aspect, the invention comprises a fishing lure comprising: a jig having a body with a longitudinal axis, an uppermost surface, a rearward surface, at least one hook, the hook(s) including a shank and a hook end, a shank being surrounded by and protruding rearwardly from the body and a hook end being spaced rearwardly behind the rearward surface of the body along the longitudinal axis of the body; a blade having an edge proximal the jig body, wherein, during retrieval, a majority of the blade is oriented above the uppermost surface of the jig body; and a joining mechanism placed between the body and the blade, wherein at least a first portion of the joining mechanism is mechanically affixed to the body and at least one other portion is coupled to the blade; and whereby retrieval of the lure causes the blade to oscillate.

The at least one other portion coupled to the blade can be configured to allow multiple degrees of freedom of motion, depending on the style and/or form this coupling takes. In general, all forms and styles should allow the blade the freedom to rotate in at least a limited fashion about one or more of the roll, pitch and yaw axes, and may include the ability to move within planes defined by those axes.

In one embodiment of the foregoing general aspect, the at least one other portion may be mechanically coupled to the blade via a pin structure.

In certain forms of these embodiments, one or more portions of the pin structure, including but limited to the pin ends, and the stems, may be bifurcated.

In various other embodiments, the blade, in whole or in part, may comprise: a flat portion contained within a single plane, at least of portion of the blade may be angled out of plane from the rest of the blade, and/or at least of portion of the blade may be curved out of plane from the rest of the blade. In variations on these embodiments, the blade may comprise multiple portions, each of which may differ from at least one other portion, in being flat, angled, or curved. Further, the amount of angle or degree or form of curve, may be different for different portions.

In certain other embodiments the circumference of the blade may comprise a single segment, or may comprise at least two segments.

In yet embodiments, the first portion of the joining mechanism and at least one other portion of the joining mechanism, or both, may be removably connected to the body.

In still another embodiment, the at least one other portion may be mechanically coupled via a pin structure, where the pin structure or at least one pin end of said pin structure is secured within at least one chamber located on the blade, proximal to the edge of the blade closest to the body.

In various forms of these embodiments, the chamber may be created via rolling at least a portion of the blade over itself, may be a separate member, affixed toward the proximal end of the blade, and/or may be sized such that the pin structure is allowed: move vertically along a plane defined by the majority of the blade body, may be free to oscillate across the roll axis, may be free to oscillate across the yaw axis, and/or may be free to rotate around the pitch axis, allowing the blade multiple degrees of freedom of motion.

In other embodiments, the side-to-side motion of the oscillating blade about the joining mechanism may be limited by contact of the blade with the jig body, contact of the blade with the eyelet, and/or movement and contact of the pin structure with the chamber.

BRIEF DESCRIPTION OF THE DRAWINGS

The invention will be described in detail with reference to the accompanying drawings. Each of the figures is a schematic diagram more fully described below.

Figure 3:
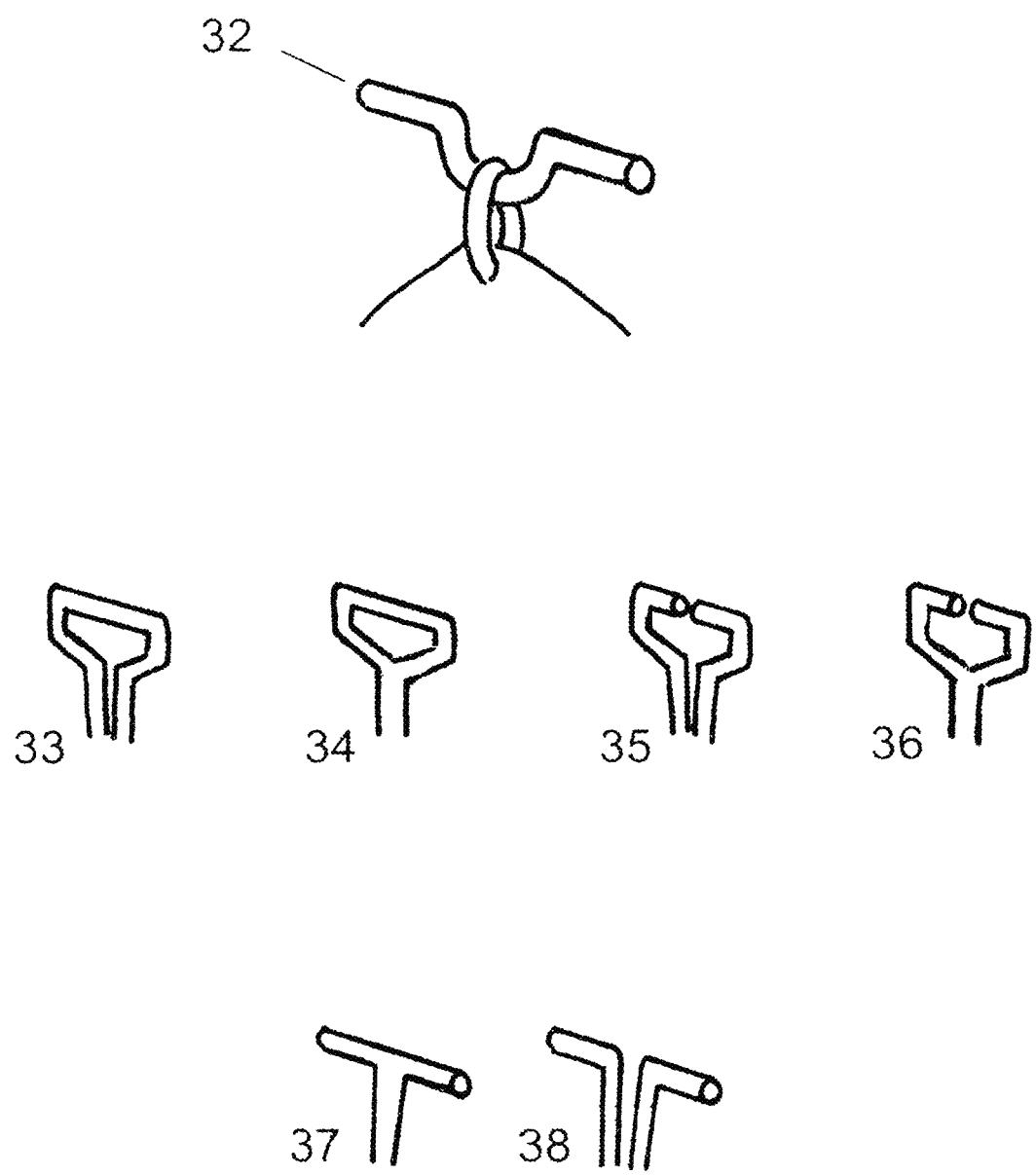
FIG. 3 is a decomposed view of some of the more common pin structures used in this invention. The pin structure can take various forms, as shown in this drawing, where the pin can have a single bar connection or be bifurcated. The pin ends may connect to a common stem, or have separate stems. Further, the pin may comprise a single bar or multiple bars. For those instances of pins comprising multiple bars, the bars (the pin ends) may point inward or outward.

Although the pin structures shown in FIG. 3 show pin structures with a mostly circular cross-section, other pin structures can have different styles and forms with different cross-sections. The cross sections can be uniform, or can vary. Additionally, while FIG. 3 details somewhat angular paths for the pin structure(s)/stem(s), there is no limitation on the form or style that may be used.

While some of these pin structures can be permanently connected (directly or indirectly) to the body and the blade, in other instances the pin structure can be secured such that at least one end is removeably fastened.

Figure 4:
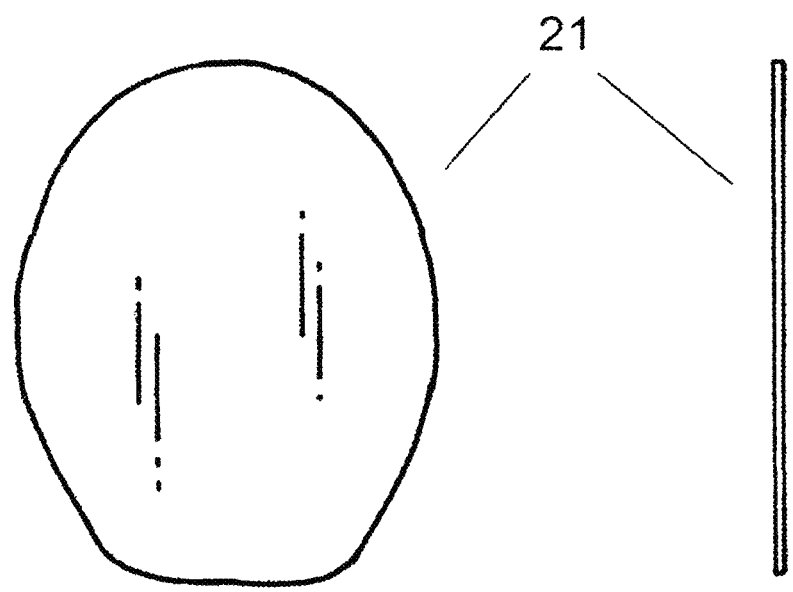

FIG. 4 shows a front-facing and side view of the blade wherein the blade is flat and contained within a single plane. The blade circumference is a single, continuous segment.

Figure 5:
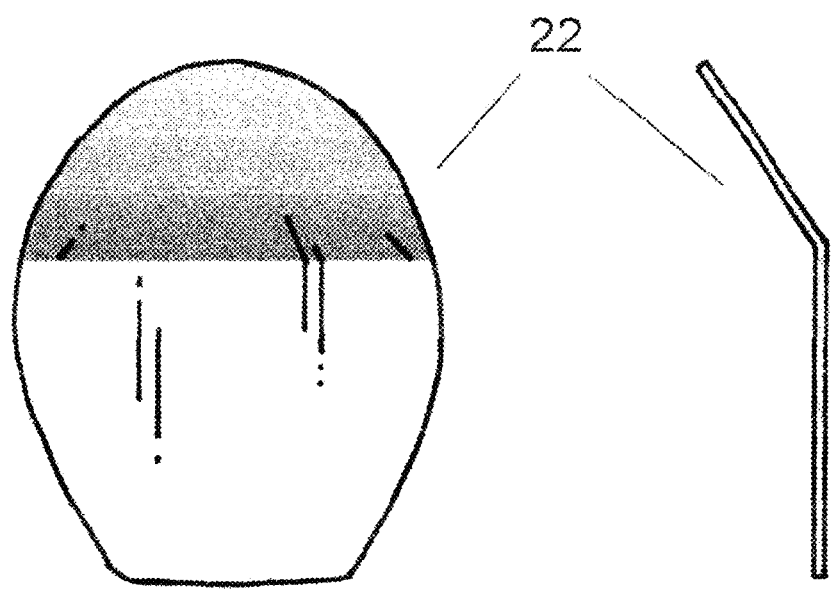

FIG. 5 details a front-facing and side view of the blade wherein the blade is flat and at least a portion of the blade is angled out of plane from the first portion of the blade. The blade circumference details multiple segments: a first, flat segment on the bottom, with two angled segments left and right connected to this first segment, and a forth arcuate segment connecting the upper portions of the left and right angled segments.

Figure 6:
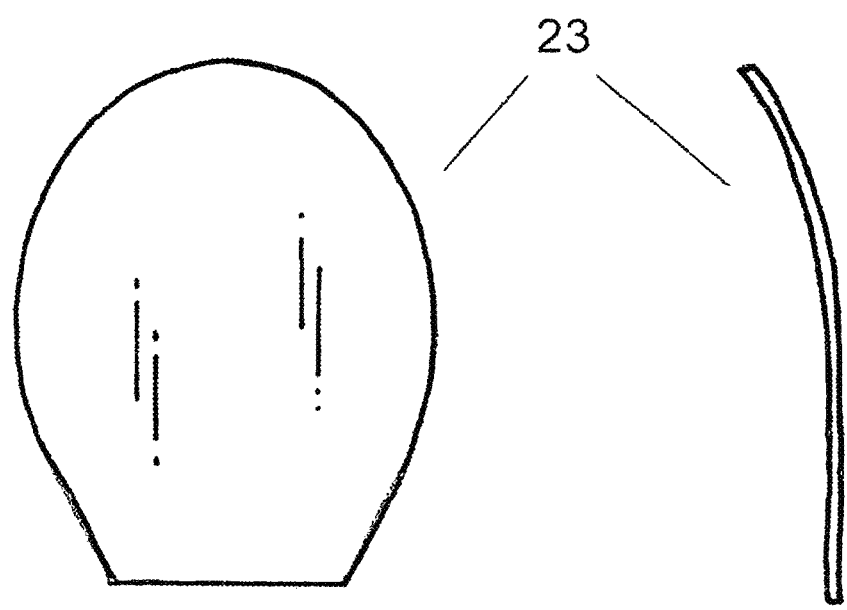

FIG. 6 is a front-facing and side view of the blade wherein the blade is flat and at least a portion of the blade is curved out of plane from the first portion of the blade. The blade circumference details multiple segments: a first, flat segment on the bottom, with two angled segments left and right connected to this first segment, and a forth arcuate segment connecting the upper portions of the left and right angled segments.

Figure 7:
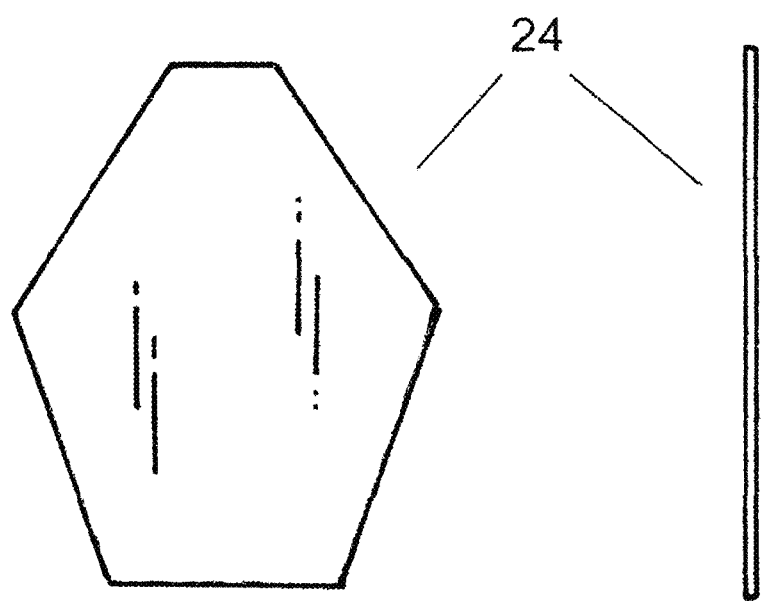

FIG. 7 is a front-facing and side view of the blade wherein the blade is flat and contained within a single plane. The blade circumference is multi-segmented, in this case having six segments, taking the form of an elongated hexagon.

FIGS. 8A and 8B are decomposed views of the pin structure, coupled to the body, showing a section of the body and a section of the stem(s) of the pin structure, in this case a bifurcated set of pin stems in FIG. 8A and a single, combined stem in 8B.

FIGS. 9A and 9B are decomposed views of the pin structure, coupled to the body, showing a section of the body and a section of pin structure, in this case the pin is connected to the body via an eyelet. In FIG. 9A, the pin structure has outward-facing pins connected via a U-shaped member, which passes through an eyelet. In FIG. 9B, the pin structure is a simple rod and the bottom-most section of the blade has a cut-out so that the eyelet does not impinge the blade.

Figure 10:
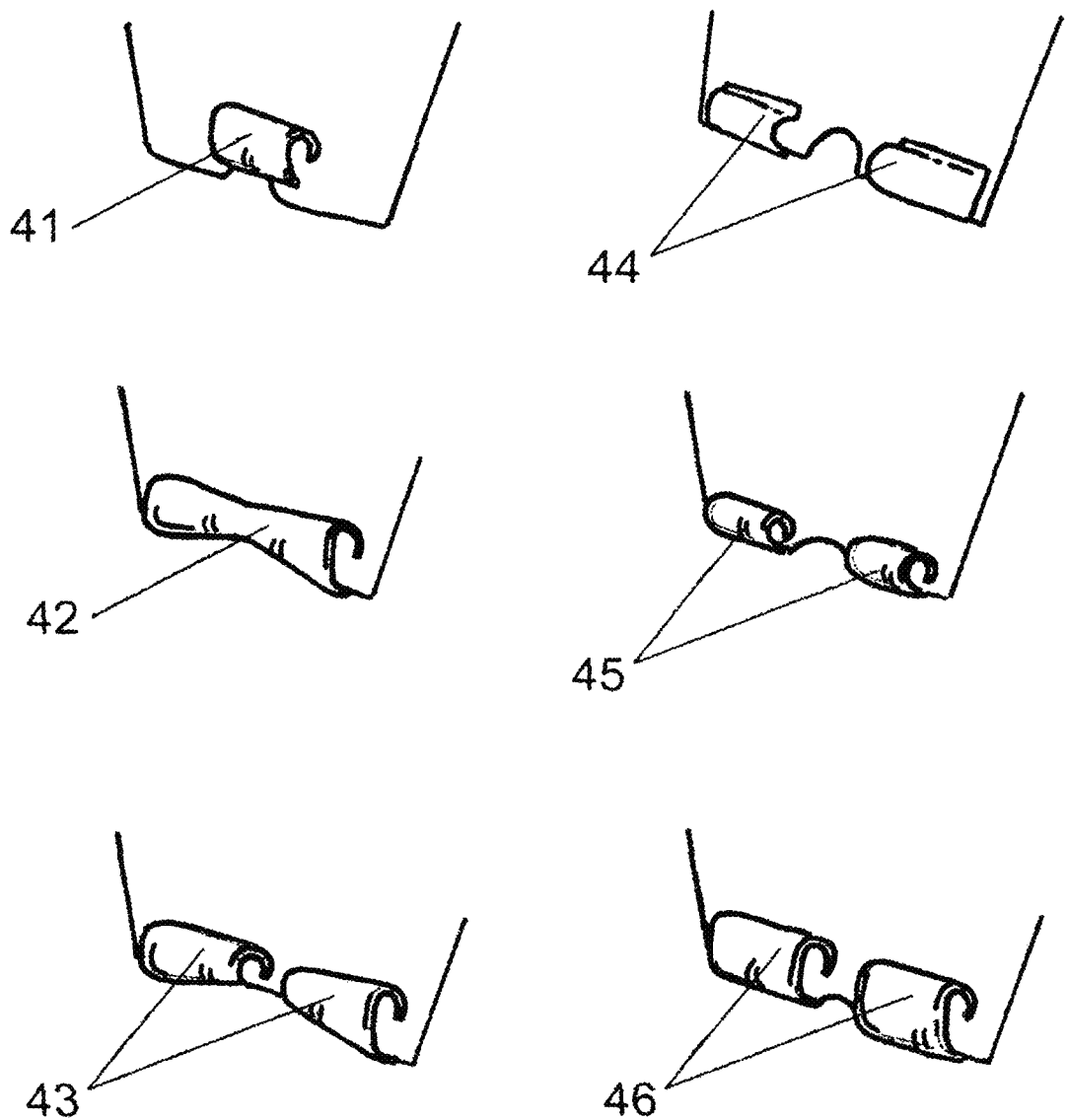

FIG. 10 shows some of the various types of chambers available in this invention. As posited elsewhere, the chamber can be created by rolling a portion of the bottom-most section of the blade over onto itself, or can be a separate piece(s) that is/are mechanically bonded to the blade. The chamber can be a single piece or multiple separate pieces. Further, the chamber may have a fixed geometry or a variable geometry. The chamber geometry and sizing can allow the blade to rotate around the pitch, roll and/or yaw axes, and/or move vertically along one or more of these axes.

FIG. 11A is an end view of a fishing lure according to the present invention showing the range of side-to-side motion of fishing lure's blade limited by the jig's eyelet.

FIG. 11B is a top view of a fishing lure according to the present invention showing the range of side-to-side motion of fishing lure's blade limited by the jig body.

Figure 12A:
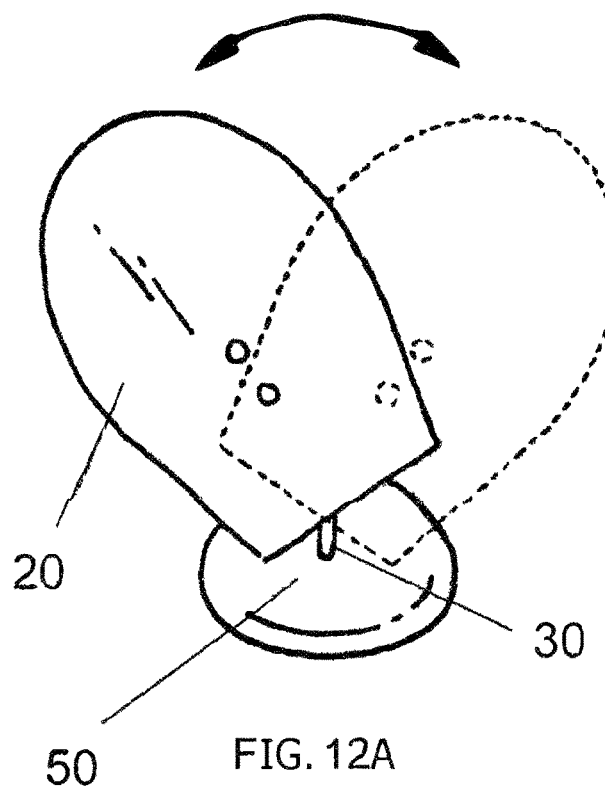

FIG. 12A is an end view of a fishing lure according to the present invention showing the range of side-to-side motion of fishing lure's blade limited by freedom of motion of the pin structure inside the chamber.

Figure 12B:
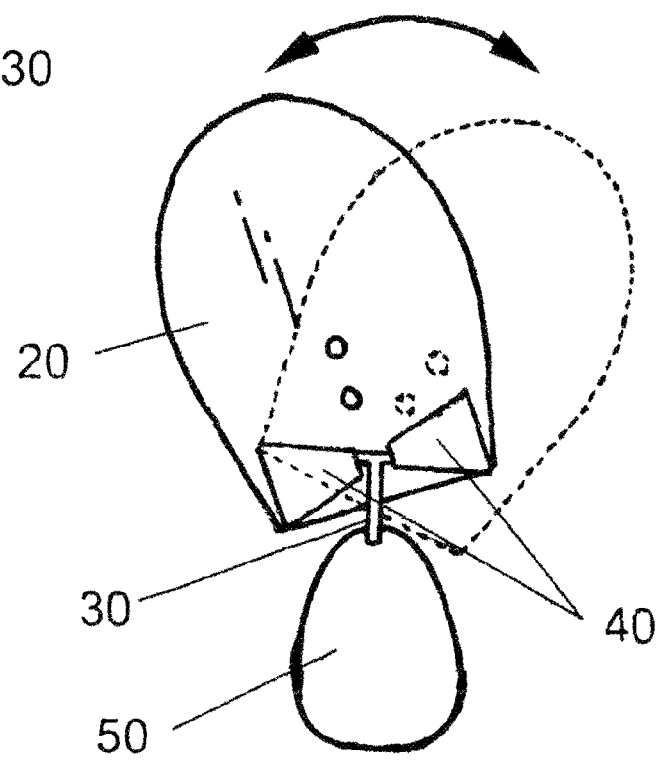

FIG. 12B is a top view of a fishing lure according to the present invention showing the range of side-to-side motion of fishing lure's blade limited by freedom of motion of the pin structure inside the chamber.

DETAILED DESCRIPTION OF THE DRAWINGS

Figure 1:
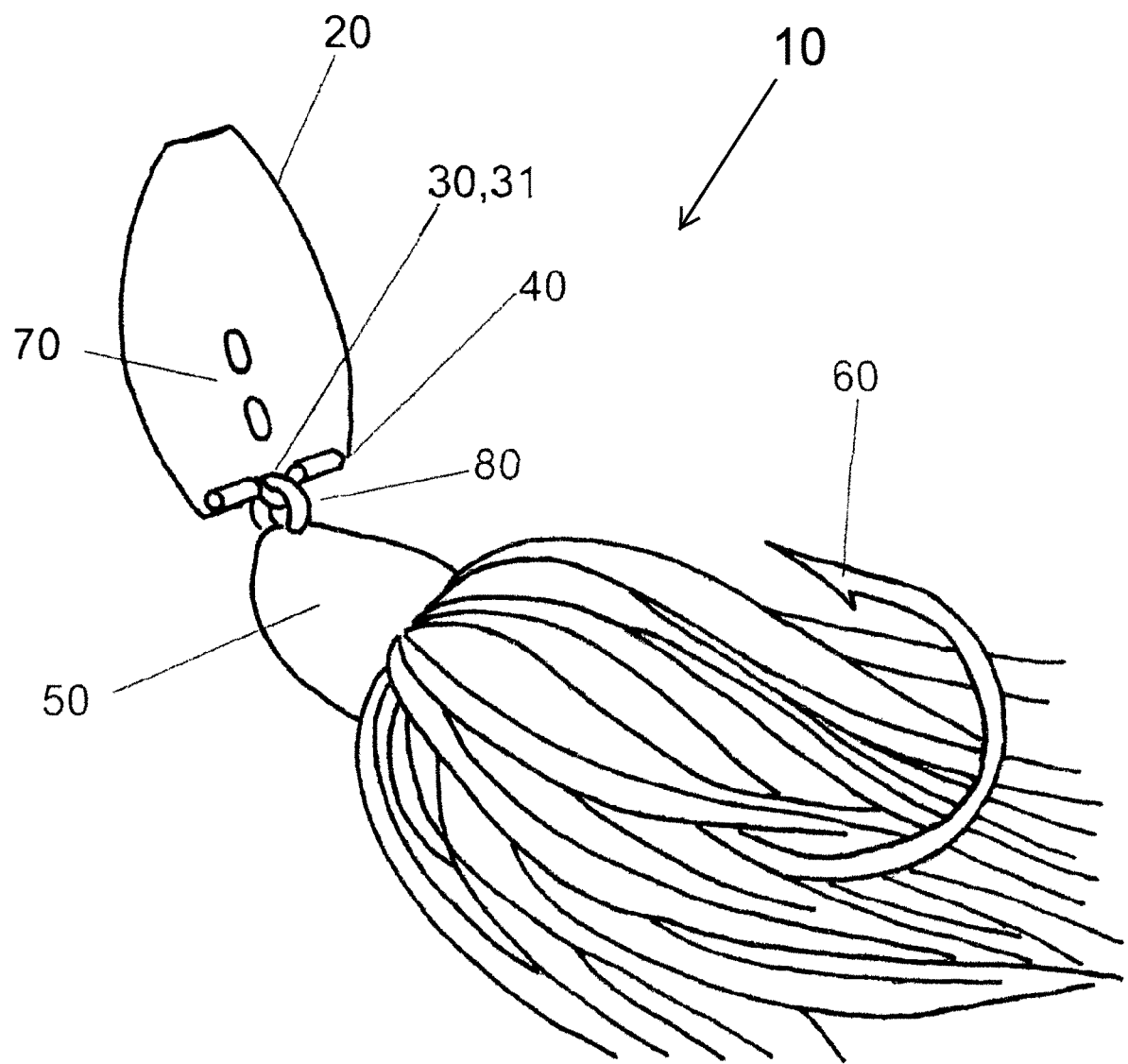
FIG. 1 is a front perspective view of the fishing lure, including a hook and a blade.

The present invention is a fishing lure with an oscillating blade, designated generally as 10 in the drawings. Referring to FIG. 1, fishing lure 10 comprises a blade 20, a pin structure 30, at least one chamber 40, a body 50, and a hook 60. The fishing line attaches to the lure via the fishing-line holes 70 in the blade. As the lure is pulled through the water, the water rushing past the blade causes the blade to oscillate relative to the movement of the lure.

The positioning of the fishing-line holes 70 will clearly effect the behavior of the lure 10. The fishing-line holes create a moment arm with respect to the direction of motion of the lure 10. Fishing-line holes 70 can be placed toward the bottom of the blade, toward the top of the blade, or anywhere in between, but are preferably located along the yaw axis. Location of the holes 70 higher on blade 20 creates a tendency for the lure 10 to dive; location the holes 70 lower on blade 20 creates a tendency for the lure 10 to climb toward the surface. Although most of the included drawings show only two holes 70 for simplification, multiple fishing-line holes can be incorporated into the design, allowing the fisherman to select a hole (or set of holes) that will give the lure the action (moving up to the surface, running parallel, or diving down) that the fisherman desires.

In FIG. 1, blade 20 is attached to body 50 via a pin structure 30 and an eyelet 80. In the instant drawing, pin structure 30 comprises a single-bar pin 31. Single-bar pin 31 passes through an eyelet 80 which couples pin structure 30 to body 50. Pin structure 30 is further coupled to blade 20 via chamber(s) 40. In the instant drawing, chamber 40 is a multi-section chamber 44 wherein the individual chambers were created by rolling sections of the bottom-most portion of blade 20. Blade 20 has a cut-out at the bottom, allowing blade 20 freedom to move relative to eyelet 80.

Figure 2:
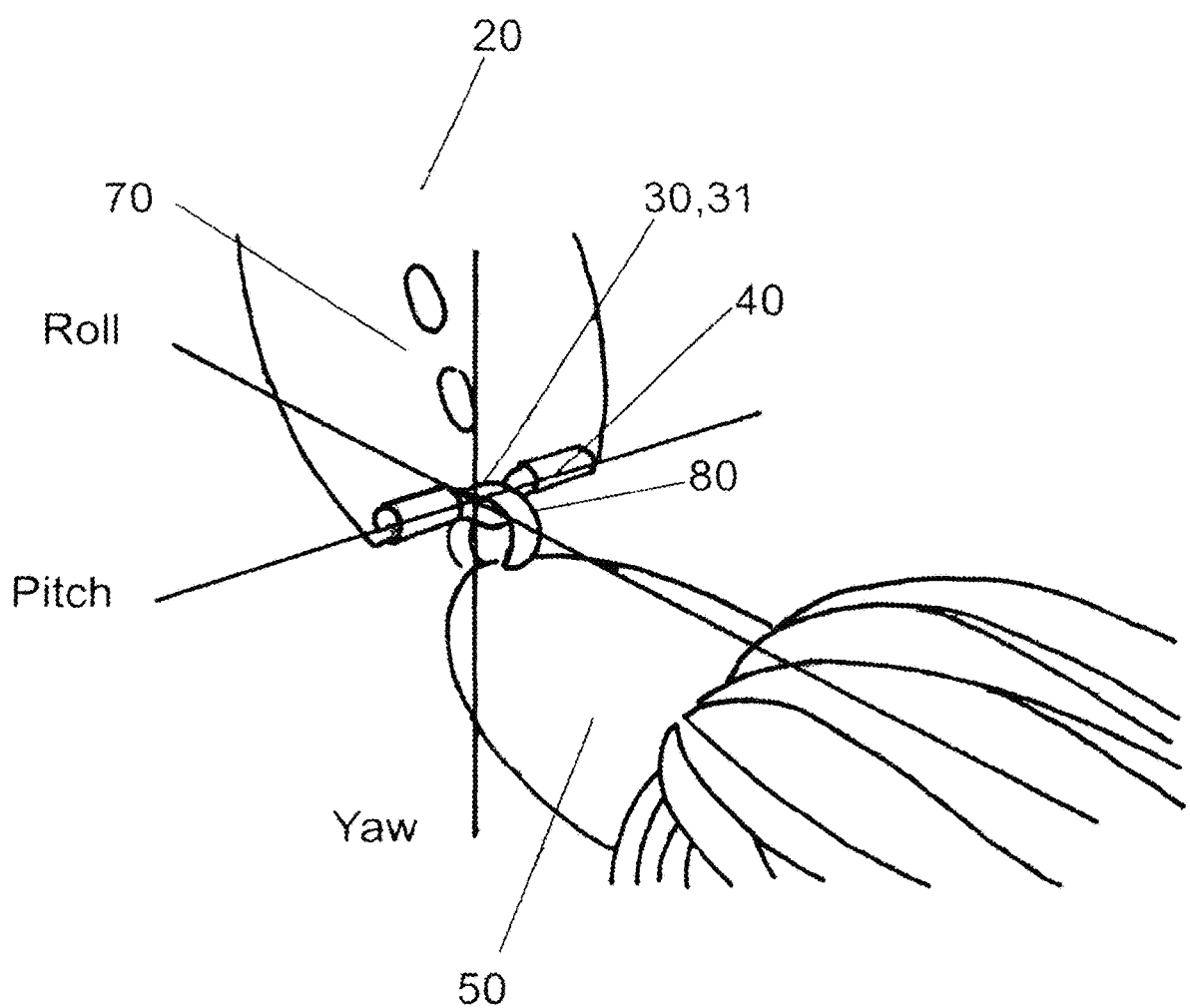
FIG. 2 is a front perspective of the forward portion of the FIG. 1, detailing the roll, pitch and yaw axes with respect to the blade, the pin structure and the chamber; the roll axis being more or less defined by the major axis running through the body of the lure.

In the instant drawing, the blade is free to oscillate around the eyelet until it contacts body 50. Thus, body 50 acts as a limiter, forcing the blade to rebound in the opposite direction. As would be obvious from FIG. 2, blade structure 20 can rotate around the pitch axis due to pin structure 30. Pin structure 30 can also rotate around the roll axis due to its connection with eyelet 80. Depending on the separation allowance between pin 31 and eyelet 80 created by the cut-out at the base of the blade, blade 20 may also rotate around the yaw axis: tight or no gap between the two would limit yaw rotation, while a large gap would allow for greater rotation.

FIG. 3 details the various configurations of pin structures available in this invention. Compared and contrasted with the single bar pin 31 shown in FIG. 1, the single bar with U-shaped dip 32 would fit roughly the same chamber, but would allow a great degree of motion than 31. Alternatively, the pin can have variations of bar and/or stem forms, with and without the requirement or use of an eyelet. The below table details some of the more common variations:

TABLE 1

Pin Structure 30 types

| Item Number | Bar type | Pin direction | Stem type |
| --- | --- | --- | --- |
| 31 | Single bar | Out from center | None |
| 32 | Single bar | Out from center | None |
| 33 | Single bar | In toward center | Bifurcated |
| 34 | Single bar | In toward center | Shared |
| 35 | Separate pins | In toward center | Bifurcated |
| 36 | Separate pins | In toward center | Shared |
| 37 | Single bar | Out from center | Bifurcated |
| 38 | Separate pins | Out from center | Shared |

Additionally, there is no limitation to the form or style the pin-structure material may take. Items 31-38 all detail various preferred embodiments, that is, a bar material with a circular cross-section due to its ease of manufacturability. However, circular cross-sections are not a limitation expressed in the present invention, and the cross section could just as easily be square or ovoid, or some combination thereof, should that shape offer better functionality or manufacturability.

Furthermore, while the forms of the pin structures in 33-38 are angular, this is also not a limitation of the present invention. As could easily be observed by a person skilled in the art, pin structures similar to item 35 could just as easily be reworked such that the left and right members create a modified "C" shape with the root becoming the stem, which is connected to body 50, and the crown being the pin, which enters chamber 40. In fact, chamber 40 can be modified from its shown forms (FIG. 10) such that pin structure 30 and chamber 40 mate appropriately, and provide the blade with the required freedom of motion in the appropriate axes.

As detailed in the claims, some pin structures 30 could, depending on chamber 40, take the form of a single, solid, straight bar, passing directly through (and connected with) body 50, with just the ends exiting body 50. Chamber 40 would then take the form of a composite of item 44 (with the chambers spaced for an appropriately body-sized cut-out at the base of blade 20 allowing some motion around the body 50), and perhaps item 43, where the chambers are elongated conic sections, allowing additional motion for the blade.

Lastly, certain pin-structures styles and forms avail themselves to being able to be removably connected to the body and/or the blade, allowing the end-user to easily replace a broken piece, or merely change one body or blade for another in order to create a lure that better suits the conditions, i.e., swapping a smaller blade for a larger blade with a different shape to create a lure that follows a longer side-to-side path, or that rises and/or falls faster. Examples of such pin structures can be easily seen in items 35, 36, and 38, which could be manufactured of materials that allow them to be bent into and pulled from chamber 40 by an end-user. Further, the shape of the pin structures can be accentuated into a more spring-like shape to better allow ease of removal and replacement by the end-user.

FIGS. 4, 5 and 6 are used to detail some of the various shapes and orientations blade 20 may take. In FIG. 4, the face-view shows a mostly ovoid shaped blade 21, the edge of which is a single continuous segment. The side-view shows that blade 21 is flat, that is, the surface of the blade is contained in a single plane.

FIG. 5 shows the roughly the same blade as FIG. 4 (21) except that face-view details that the edge of blade 22 has multiple segments: a bottom edge, two angled segments connected to the bottom edge on the left and the right, and a long arcing segment connecting the left- and right-angled segments. The side-view details that at least a portion of the blade 22 is angled out of plane from the rest of the body. With respect to the out-of-plane section, blade 20 can have a single-angled section, or multiple angled sections, each of which can have a different angle.

FIG. 6 shows the same face view as FIG. 5, but the side-view details that at least a portion of the blade 23 is curved out of plane from the rest of the body of the blade. As can be appreciated, a blade 20 can have multiple sections, each of which can be curved or angled, separately, as desired. Additionally, the curve can be a constant curve (e.g., a circular arc, a parabolic arc, a hyperbolic arc), or variable curve.

The number of out-of-plane sections, the degree each is angled, and/or the amount each is curved will impact the forces on the blade as it is pulled through the water, thus, impacting the motion of lure 10. Bending or curving some portion or portions of blade 20 will decrease the effective surface area of the blade, decreasing the amount of drag the blade experiences as fishing lure 10 is pulled through the water. It can be appreciated that varying the degree of drag will affect both the tendency of fishing lure 10 to dive or run to the surface, and the tendency of blade 20 to oscillate from side-to-side of the fishing lure 10. Decreasing the surface area of blade 20 has a stabilizing effect on the path of the lure 10, while increasing the surface area of blade 20 causes the lure 10 to follow a more erratic path.

Of course, as can readily be understood by those of skill in the art, blade 20 can be manufactured of such materials, or in such fashion, as to allow an end-user to easily alter the shape of blade 20 by bending or curving it, e.g., incorporating a crease line(s) in blade 20 to make bending/curving easier.

FIG. 7 details one of the many different face-view configurations available for blade 20 in the present invention. While blades 21, 22 and 23 where each formed with either a single, continuous circumference segment (21) or using arcing segments (22, 23), blade 24 has a multi-segment circumference wherein each segment is angled from the next. In the instant drawing, blade 24 is an oblong hexagon, having six segments. As can be inferred from the previous discussion on how curving or angling some portion of the surface area of blade 20 impacts the motion of the blade as lure 10 is retrieved, the shape, angle, and number of segments also changes the motion of blade 20, the speed of oscillation of blade 20, and thus, the motion of lure 10.

FIGS. 8A and 8B detail the attachment of pin structure 30 to body 50. In the instant drawings, pin structure 30 connects directly to body 50 without need of an eyelet 80. In FIG. 8A, the pin structure has a bifurcated stem 38; in FIG. 8B, the pin structure has a common, shared stem 37. Pin structure 30 is coupled to the blade via chamber 40. Chamber 40 geometry dictates the motion, and range of motion, of blade 20. Blade 20 is free to rotate around the axis created by the pins, and the pins are free to move within chamber 40, providing at least three degrees of freedom for blade 20 to move, rotate and oscillate.

FIGS. 9A and 9B detail the attachment of pin structure 30 to body 50 via use of an eyelet 80. In FIG. 9A, pin structure 30 comprises a variation of pin structure 32, where the bar comprises a deep U-shape, which passes through eyelet 80. In FIG. 9B, pin structure 30 is a single bar 31 which passes through eyelet 80.

It is observed in FIG. 9 that blade 20 has a cut-out at its base allowing blade 20 to freely move about eyelet 80 without impinging it. In FIG. 9A, the cut-out is shallow and wide due to the large U-shape of pin structure 30; in FIG. 9B, the cut-out is deeper but narrower. In both cases, the pin structure allows blade 20 to have full six-degree freedom of motion with respect to eyelet 80, while allowing blade 20 to be able rotate around pin structure 30.

Eyelet 80 can be integrally connected to body 50, such that a portion of eyelet 80 is buried within body 50 (FIG. 9B), or eyelet 80 can be offset from body 50 by use of a small stem (FIG. 9A; stem hidden underneath bottom-most portion of the eyelet).

FIG. 10 shows some of the various configurations, forms and shapes that chamber 40 can take in the present invention. Chamber 40 can be created by rolling a portion or portions of the bottom, or can be a separate structure(s) that is/are mechanically affixed to blade 20. When chamber(s) 40 are discrete structures, it/they can be affixed to blade 20 by mechanical bonding (e.g., crimping), welding, brazing, or any other convenient means that will provide a long-lasting, strong bond.

As shown in FIG. 10, chamber 40 can comprise a single section, or have multiple sections. Chamber 40 can be sized specifically for the pins or a bar, allowing only rotation of blade 20 around the axis of the pins, or in other instances, can be sized such that the pins can move vertically along the face of body 20, as well as tip side-to-side (roll axis), allowing blade 20 to oscillate perpendicular to the axis of the pins. Further, the geometry of chamber 40 can be such that pin structure 30 can both rotate along the pitch axis and the roll axis, via use of conic sections.

The below table identifies some of the more common variations of chamber 40 allowed within the present invention:

TABLE 2

| | Chamber 40 types | | |
|---|---|---|---|
| Item Number | Number of chambers | Chamber creation | Chamber geometry |
| 41 | One | Rolled from blade | Elongated column |
| 42 | One | Rolled from blade | Conic sections |
| 43 | Two | Rolled from blade | Conic sections |
| 44 | Two | Mechanically bonded | Column |
| 45 | Two | Rolled from blade | Columns |
| 46 | Two | Rolled from blade | Elongated column |

By increasing the size of the chamber 40 relative to the pin size, or using a differently shaped chamber, the degrees of freedom of motion, and the range of motion allowed for blade 20 are controllable.

Figure 11:
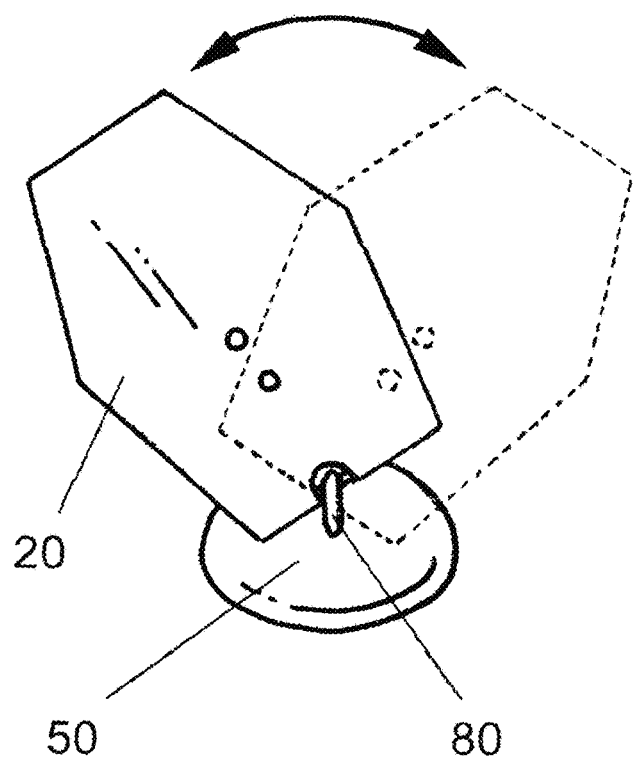
Figure 11:
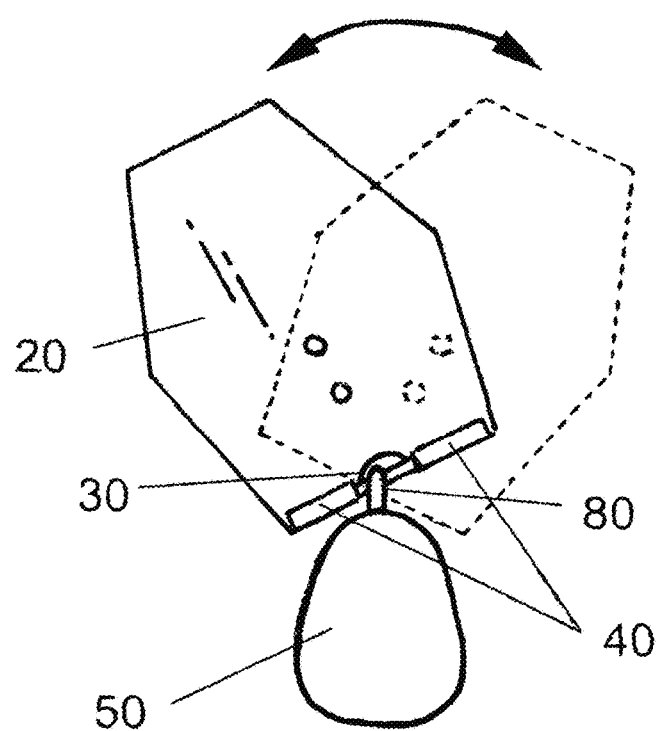

FIGS. 11 and 12 detail the range of motion of blade 20 with respect to body 50.

FIGS. 11A and 11B show blade 20 connected via pin structure 30 which pass through eyelet 80. FIG. 11A is an end-view, detailing how body 50 acts to limit the range of motion of blade 20. FIG. 11B is a top-view of the same, again detailing how body 50 limits the range of motion of blade 20.

As can be understood from the drawings, the size of eyelet 80 and the distance its farthest edge is from body 50 will determine the range of sideways motion allowed by blade 20. The larger eyelet 80, the farther away blade 20 can be, allowing for a greater range of motion; the smaller eyelet 80, the nearer blade 20 will be to body 50, decreasing the allowed range of motion. Further, the cut-out at the base of blade 20 will also act to control to some extent, the rotation and/or oscillation of blade 20 around eyelet 80, as well as any allowed motion along planes defined by the roll, pitch, and/or yaw axes.

FIGS. 12A and 12B show blade 20 connected via pin structure 30 coupled to body 50 via chamber 40. In the instant drawing, chamber 40 has the form of a pair of conic sections. FIG. 12A is an end-view, detailing how chamber 40 acts to limit the range of motion of blade 20 via the motion of pin structure 30 inside chamber 40. FIG. 12B is a top-view of the same, again detailing how chamber 40 limits the range of motion of blade 20.

It is to be understood that the present invention is not limited to the embodiments described above, but encompasses any and all embodiments within the scope of the following claims, individually, or in variations combinations.

APPENDIX A. OBJECT IDENTIFICATION NUMBERS

The following table identifies the objects labeled in the included drawings

| | |
|---|---|
| 10 | Fishing Lure with Oscillating Blade |
| 20 | Blade |
| 21 | Straight Blade |
| 22 | Partially Angled Blade |
| 23 | Partially Curved Blade |
| 24 | Blade with multi-segment circumference |
| 30 | Pin Structure |
| 31 | Single bar pin |
| 32 | Single bar pin with U-section |
| 33 | Inward facing single pin with bifurcated stems |
| 34 | Inward facing single pin with common stem |
| 35 | Inward facing pins with bifurcated stems |
| 36 | Inward facing pins with common stem |
| 37 | Outward facing pins with common stem |
| 38 | Outward facing pins with bifurcated stems |
| 40 | Chamber |
| 41 | Single section chamber, rolled from blade |
| 42 | Single section chamber, with outward-facing conic sections |
| 43 | Multi-section chamber(s) each with outward-facing elongated conic sections |
| 44 | Multi-section chamber affixed to blade |
| 45 | Multi-section chamber rolled from blade |
| 46 | Multi-section chamber with elongated column structure |
| 50 | Body |
| 60 | Hook |
| 70 | Fishing line holes |
| 80 | Eyelet |

We claim:

1. A fishing lure comprising:
   a jig body with a longitudinal axis, an uppermost surface, and a rearward surface;
   at least one hook including a shank and a hook end, the shank being surrounded by and protruding rearwardly from the jig body and the hook end being spaced rearwardly behind the rearward surface of the jig body along the longitudinal axis of the jig body;
   a blade having an edge proximal to the jig body, wherein the blade includes at least one chamber on the edge proximal to the jig body, and wherein, during retrieval, a majority of the blade is oriented above the uppermost surface of the jig body; and
   a joining mechanism connecting the body and the blade, the joining mechanism including a pin structure that is coupled to the blade via the at least one chamber, the pin structure including a midsection between two pin ends, the joining mechanism further including a first portion mechanically affixed to the jig body, wherein the midsection of the pin structure engages the first portion affixed to the jig body while the two pin ends of the pin structure are positioned within the at least one chamber;
   whereby retrieval of the lure causes the blade to oscillate.

2. The fishing lure as in claim 1, wherein the pin structure is bifurcated.

3. The fishing lure as in claim 1, wherein the blade contains a flat portion comprised within a single plane.

4. The fishing lure as in claim 1, wherein at least a portion of the blade is angled out of plane from a remaining portion of the blade.

5. The fishing lure as in claim 1, wherein at least a portion of the blade is curved out of plane from a remaining portion of the blade.

6. The fishing lure as in claim 1, wherein the circumference of the blade comprises one of a single continuous segment or at least two segments.

7. The fishing lure as in claim 1, wherein the first portion of the joining mechanism is removably connected to the body.

8. The fishing lure as in claim 1, wherein the at least one other portion of the joining mechanism is removably connected to the blade.

9. The fishing lure as in claim 1, wherein the chamber is comprises a rolled edge portion of the blade.

10. The fishing lure as in claim 1, wherein the chamber is a separate member, affixed toward the proximal end of the blade.

11. The fishing lure as in claim 1, whereby the oscillating motion of the blade about the joining mechanism is limited by contact of the pin structure with the chamber.

12. The fishing lure as in claim 1, whereby the oscillating motion of the blade about the joining mechanism is limited by contact of the blade with the jig body.

13. A fishing lure comprising:
    a jig body with a longitudinal axis, an uppermost surface, and a rearward surface;
    at least one hook including a shank and a hook end, the shank being surrounded by and protruding rearwardly from the body and the hook end being spaced rearwardly behind the rearward surface of the body along the longitudinal axis of the body;
    a blade having an edge proximal to the jig body, wherein at least one chamber is provided on the edge of the blade proximal to the jig body. and wherein, during retrieval, a majority of the blade is oriented above the uppermost surface of the jig body; and
    a joining mechanism placed between the body and the blade, the joining mechanism including a pin structure that is coupled to the blade via the at least one chamber, the pin structure including a midsection between two pin ends, the joining mechanism further including a first portion mechanically affixed to the jig body, and wherein the midsection of the pin structure engages the first portion affixed to the jig body while the two pin ends of the pin structure are positioned within the at least one chamber;
    whereby retrieval of the lure causes the blade to oscillate; and
    wherein the blade is allowed to oscillate via movement of the pin structure within the chamber and/or about the first portion affixed to the jig body.

14. The fishing lure as in claim 13, wherein the pin structure is bifurcated.

15. The fishing lure as in claim 13, wherein the blade contains a flat portion comprised within a single plane.

16. The fishing lure as in claim 13, wherein at least a portion of the blade is angled out of plane from a remaining portion of the blade.

17. The fishing lure as in claim 13, wherein at least a portion of the blade is curved out of plane from a remaining portion of the blade.

18. The fishing lure as in claim 13, wherein the circumference of the blade comprises one of a single continuous segment or at least two segments.

19. The fishing lure as in claim 13, wherein the first portion of the joining mechanism is removably connected to the body.

20. The fishing lure as in claim 13, wherein the at least one other portion of the joining mechanism is removably connected to the blade.

21. The fishing lure as in claim 13, wherein the chamber comprises a rolled edge portion of the blade.

22. The fishing lure as in claim 13, wherein the chamber is a separate member, affixed toward the proximal end of the blade.

23. The fishing lure as in claim 13, whereby the oscillating motion of the blade about the joining mechanism is limited by contact of the pin structure with the chamber.

24. The fishing lure as in claim 13, whereby the oscillating motion of the blade about the joining mechanism is limited by contact of the blade with the jig body.

25. The fishing lure as in claim 1, wherein retrieval of the lure causes the blade only to oscillate.

26. The fishing lure as in claim 13, wherein retrieval of the lure causes the blade only to oscillate.

\* \* \* \* \*